United States Patent [19]

Seo et al.

[11] Patent Number: 5,194,511

[45] Date of Patent: Mar. 16, 1993

[54] ORGANIC NONLINEAR OPTICAL MATERIALS DERIVED FROM VINYLIDENE CYANIDE-VINYL-P-ACETOXY-BENZOATE COPOLYMERS

[75] Inventors: Iwao Seo; Manabu Kishimoto; Atsushi Oda; Kenji Nakajima, all of Ami, Japan

[73] Assignee: Mitsubishi Petrochemical Co., Ltd., Tokyo, Japan

[21] Appl. No.: 828,575

[22] Filed: Jan. 31, 1992

[30] Foreign Application Priority Data

Feb. 6, 1991 [JP] Japan .................................. 3-035008
Aug. 23, 1991 [JP] Japan .................................. 3-235627

[51] Int. Cl.$^5$ ............................................ C08F 222/34
[52] U.S. Cl. .................................. 525/328.4; 525/276;
525/291; 525/292; 525/293; 525/295; 525/351;
525/353; 525/359.4; 525/376; 525/377;
526/243; 526/245; 526/246; 526/286; 526/288;
526/292.2; 526/292.3; 526/292.5; 526/298;
526/300; 526/311
[58] Field of Search ............... 525/328.4, 276, 291,
525/293, 295; 526/243, 245, 246, 298, 300

[56] References Cited

U.S. PATENT DOCUMENTS 5,061,740 10/1991 East et al. .................... 525/328.4
5,149,580 9/1992 Kishimoto et al. ................. 428/220

*Primary Examiner*—Joseph L. Schofer
*Assistant Examiner*—Mark Nagumo

*Attorney, Agent, or Firm*—Oblon, Spivak, McClelland, Maier & Neustadt

[57] ABSTRACT

There is disclosed an organic nonlinear optical material which comprises a polymer having the following constitutional units, in amounts of 5 to 100 mole % of (I) and 0 to 95 mole % of (II), and a weight average molecular weight (Mw) of the polymer being 10,000 to 2,000,000.

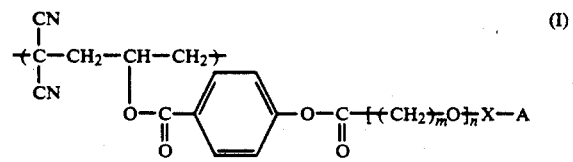

wherein the symbols represent the same meanings as defined in the specification.

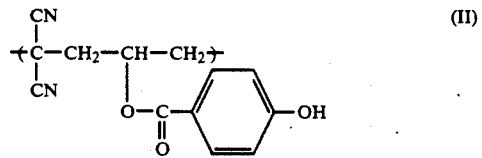

A nonlinear optical element has large nonlinear optical effect and yet is excellent in molding processability so that it can be widely applied to the filed of optical processings.

8 Claims, 2 Drawing Sheets

ORGANIC NONLINEAR OPTICAL MATERIALS DERIVED FROM VINYLIDENE CYANIDE-VINYL-P-ACETOXY-BENZOATE COPOLYMERS

BACKGROUND OF THE INVENTION

This invention relates to an optical material useful as an optical element used for optical communication and a field of optical information processing, particularly to an organic nonlinear optical material having a nonlinear optical effect and excellent in mechanical strength and molding property.

In order to apply laser beam to optical communication, optical information processing and optical processing, an optical element having various functions such as deflection, modulation or wavelength conversion is required. As such an optical element which assumes a role of the core, an optical material having a nonlinear optical effect has been known.

As the nonlinear optical material, research has been mainly carried out with respect to inorganic crystalline materials such as $LiNbO_3$, $LiIO$, $KH_2PO_4$ and $GaAs$.

However, these inorganic crystalline materials have involved the problem that a response more rapid than picosecond is difficult since an electron participating in chemical bonding between atoms or ions causes lattice vibration in response to light and also involved the problem that a breakage threshold level thereof to a strong laser beam is low and is $MW/cm^2$ order. Also, these inorganic crystalline materials are generally used as a single crystal so that mechanical strength, particularly impact strength is a little whereby various defects such as bad molding processability are involved.

Also, as a nonlinear optical material, there have been known organic molecular crystalline materials such as urea, p-nitroaniline (p-NA) and 2-methyl-4-nitroaniline (MNA). These organic molecular crystalline materials have a large nonlinear optical effect caused by nonlocalized x electron in the molecule and due to this electron polarization, they do not accept any effect from lattice vibration so that they show more rapid response and higher optical breakage threshold level than those of the inorganic crystalline materials.

These organic molecular crystalline materials are, however, also required to be a single crystal as in the inorganic crystalline materials in order to obtain a large nonlinear optical effect. Thus, those having high characteristics are insufficient in mechanical strength and thermal stability so that there involved drawbacks that their handling is extremely difficult and moldability is poor when molding them into, for example, an optical fiber or film.

SUMMARY OF THE INVENTION

An object of the present invention is to provide an organic nonlinear optical material having a large nonlinear optical effect and excellent in molding processability.

An organic nonlinear optical material of the present invention comprises a polymer having the following constitutional units, in amount of 5 to 100 mole % of (I) and 0 to 95 mole % of (II), and a weight average molecular weight (Mw) of the polymer is 10,000 to 2,000,000.

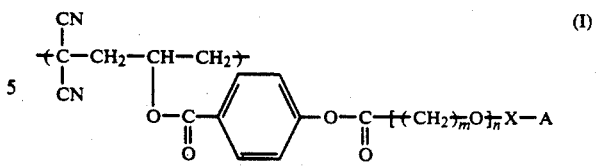

wherein m represents an integer of 1 to 10, n represents 0 or 1, X represents

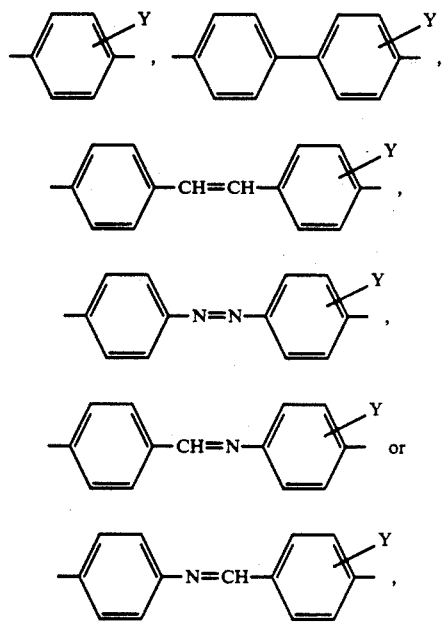

where Y represents hydrogen, fluorine, chlorine, bromine, iodine, $-NO_2$, $-CN$, $-CF_3$ or $-SO_2-C_pH_{2p+1}$, and A represents $-NO_2$, $-CN$, $-CF_3$ or $-SO_2-C_pH_{2p+1}$ where p represents an integer of 1 to 10,

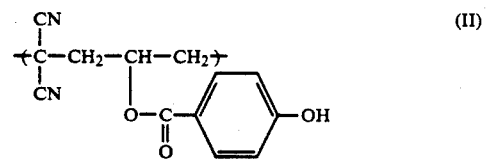

DESCRIPTION OF THE PREFERRED EMBODIMENTS

Figure 1:
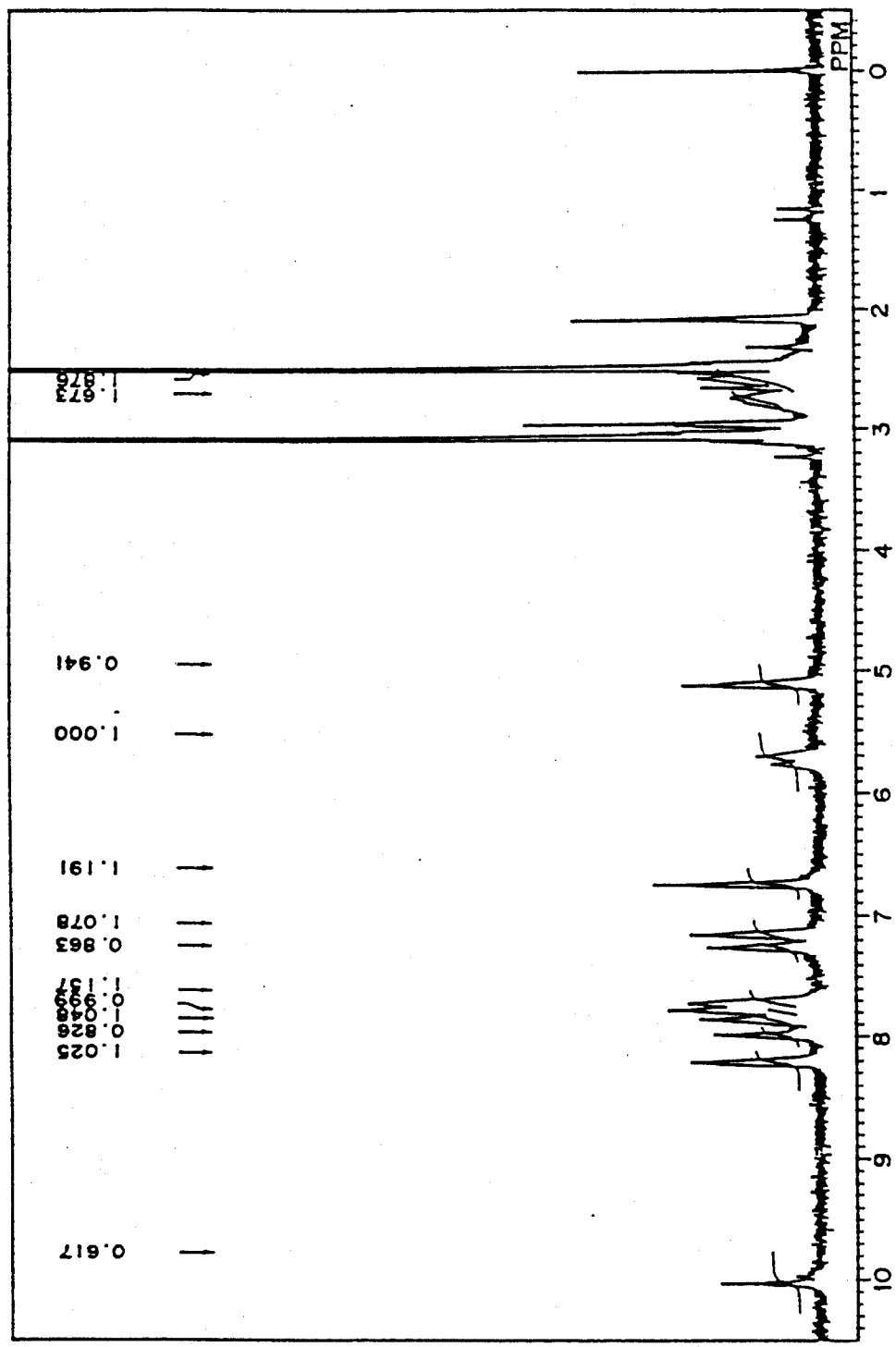
FIG. 1 is a $^1H$—NMR chart of the polymer obtained in Example 1.

In the following, the present invention will be described in detail.

The polymer to be used in the present invention comprises 5 to 100 mole %, preferably 50 to 100 mole %, more preferably 80 to 100 mole % of the unit (I) and 0 to 95 mole %, Preferably 0 to 50 mole %, more preferably 0 to 20 mole % of the unit (11).

A weight average molecular weight of the polymer (polymer mixture) to be used in the present invention is 10,000 to 2,000,000, preferably 500,000 to 1,000,000.

Next, the process for producing the polymer to be used in the present invention is to be described.

Preparation Method of the Polymer

The polymer to be used in the present invention can be synthesized by, for example, the following three steps of (1) a polymerization process, (2) a hydrolysis process and (3) a process of introducing optical effective group (a group functional to light).

(1) Polymerization process

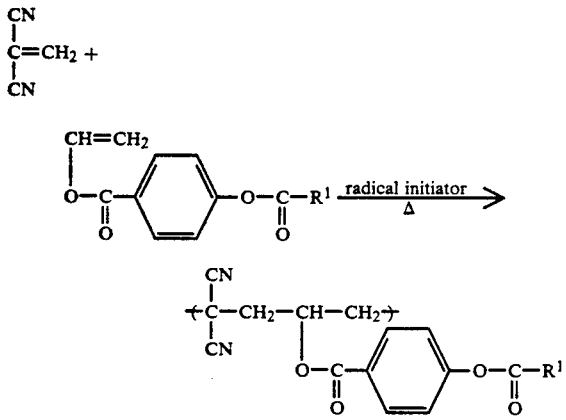

wherein $R^1$ represents an alkyl group.

Vinylidene cyanide and vinyl p-alkylcarbonyloxybenzoate are copolymerized in the presence of a radical initiator to synthesize a vinylidene cyanide-vinyl p-alkylcarbonyloxybenzoate copolymer.

The polymerization reaction can be carried out by the conventional manner.

The vinylidene cyanide-vinyl p-alkylcarbonyloxybenzoate copolymer which is a starting material of the copolymer to be used in the present invention may be an alternative copolymer or a random copolymer, preferably an alternative copolymer of 1:1.

A molecular weight of the vinylidene cyanide-vinyl p-alkylcarbonyloxybenzoate copolymer is preferably 10,000 to 2,000,000, more preferably 500,000 to 1,000,000.

(2) Hydrolysis process

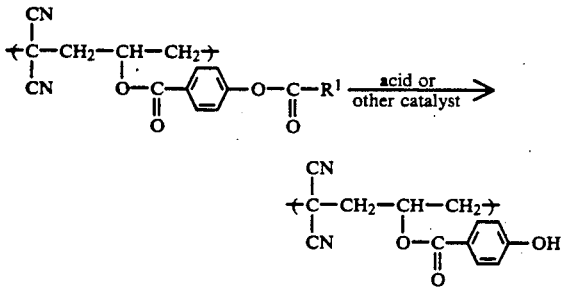

wherein $R^1$ has the same meaning as defined above.

The resulting vinylidene cyanide-vinyl p-alkylcarbonyloxybenzoate copolymer is hydrolyzed by an acid or a catalyst to give a deacylated compound.

As the acid to be used here, there may be mentioned, for example, hydrochloric acid, sulfuric acid, acetic acid and trifluoroacetic acid. These acids may be used singly or in combination of two or more.

These acids may be used by mixing with a solvent such as sulfolane, an alcohol including methanol and ethanol, and water.

As the catalyst as mentioned above, there may be mentioned, for example, a silane compound such as phenyl silane, and a tin compound.

A reaction temperature of the hydrolysis may be 60° to 100° C. and a reaction time may be several hours to several ten hours.

A hydrolysis ratio may be 80 to 100%, preferably 95 to 100

(3) Process of introducing optical effective group

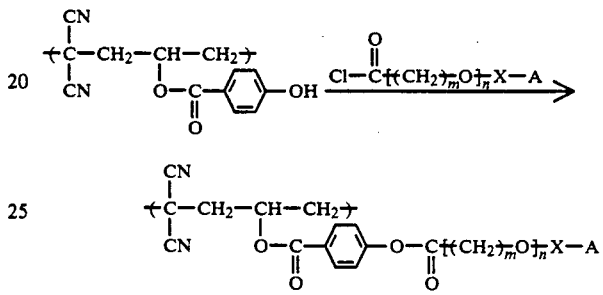

wherein m, n, X and A have the same meanings as defined above.

The copolymer to be used in the present invention can be obtained by dissolving the resulting copolymer in an organic solvent such as sulfolane again, adding a base such as pyridine or triethylamine to the solution and then heating it with a nonlinear optical compound to be introduced.

As the nonlinear optical compound to be introduced, there may be mentioned, for example, p-nitroaniline and derivatives thereof, 4-nitrobiphenyl derivatives, 4-nitrostilbene derivatives, derivatives of "Disperse Red 1" (trade name, available from Aldrich Co.) and p-nitroisocyanate derivatives.

A ratio of the nonlinear optical compound to be incorporated into the copolymer may be 5 to 100%, preferably 50 to 100% based on phenol in the copolymer.

A temperature to be heated is preferably 50° to 100° C.

Organic Nonlinear Optical Material

When a shape of the organic nonlinear optical material of the present invention is a film or sheet, it is preferred to stretch to 2- to 6-fold in order to heighten its orientation property. As the stretching method at that case, mechanical monoaxial stretching or biaxial stretching is preferred.

In the organic nonlinear optical material of the present invention, its nonlinear optical effect can be enlarged by electrically polarizing the molded material which is molded to a desired shape such as a film, sheet or fiber.

As the method of polarizing electrically, for example, in the case that the organic nonlinear optical material is a film or sheet shape, there may be mentioned the method in which metal films as electrodes are adhered to both surfaces of the film or sheet and a voltage is applied thereto.

As an electrode to be provided to the organic nonlinear optical material, there may be mentioned a metal foil, a metal plate, a conductive paste or a metal coated film formed by chemical plating, vacuum deposition or sputtering.

The voltage to be applied to the electrodes may be 10 kv/cm or more and an electric field strength of not causing insulation breakage or so, preferably 100 to 1,500 kv/cm.

A time of the polarizing process is not particularly limited and may be 10 minutes to 5 hours, preferably 10 minutes to 2 hours.

A temperature of the polarizing process may be, when the glass transition temperature of the organic nonlinear optical material to be processed is Tg °C., Tg−20° C. to Tg+20° C., preferably Tg−5° C. to Tg+5° C.

Also, when the organic nonlinear optical material is formed by the spin coat method, there may be used the method in which the organic nonlinear optical material obtained by spin coating on a NESA glass and then drying under reduced pressure is polarized by using a usual corona discharging.

EXAMPLES

In the following, the present invention will be described in more detail by referring to Examples, but the present invention is not limited by these Examples.

EXAMPLE 1

Synthesis of Polymer to be Used for Organic Nonlinear Optical Material (1) Hydrolysis of Vinylidene Cyanide-Vinyl P-Acetoxybenzoate Copolymer In 500 ml of sulfolane was dissolved at 80° C. 10 g of vinylidene cyanide-vinyl p-methylcarbonyloxybenzoate copolymer prepared according to the conventional manner, and a mixture of 25 ml of trifluoroacetic acid and 50 ml of hydrochloric acid was added thereto. The solution was stirred at 80° C. for 10 hours.

After completion of the reaction, the reaction mixture was poured into water and precipitated hydrolyzate was collected by filtration and washed with water repeatedly until washings became neutral. Next, drying under reduced pressure was carried out at 70° to 80° C. to obtain 7.7 g of a hydrolyzate represented by the formula shown below as white powder.

An average molecular weight (Mw) of the vinylidene cyanidevinyl p-acetoxybenzoate copolymer was 500,000. Identification of the resulting hydrolyzate was carried out by $^1$H—NMR (400 MHz, DMSO—d6). As the results, it can be found that hydrolysis ratio at the ester portion of the vinyl benzoate unit was 100%.

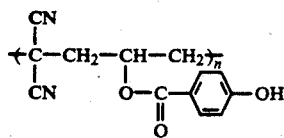

(2) Synthesis of Optical Effective Group

Synthesis of 4-(ethoxycarbonylmethoxy)-4'-nitrobiphenyl

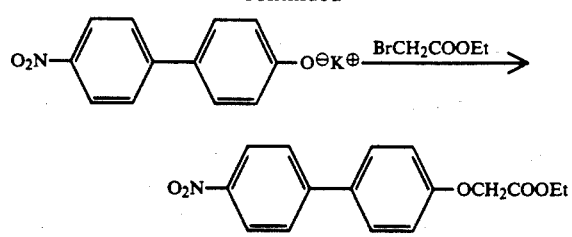

In 100 ml of N,N-dimethylformamide were stirred 10 g (0.040 mole) of a potassium salt of 4-hydroxy-4'-nitrobiphenyl synthesized according to the method of Thomas M. Leslie et al. (Mol. Cryst. Liq. Cryst., 153, 451 (1987)) and 7 g (0.041 mole) of ethyl bromoacetate (produced by Tokyo Kasei K.K.) at 100° C. for 30 minutes to obtain 9.4 g of a desired compound as yellow crystal. m.p. 99° to 100° C.

Synthesis of 4-(hydroxycarbonylmethoxy)-4'-nitrobiphenyl

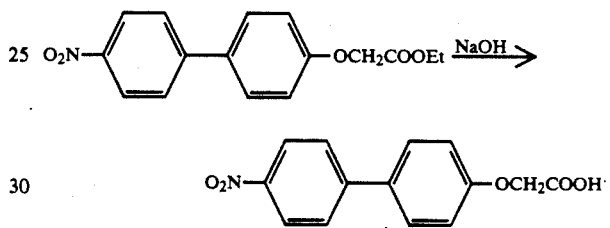

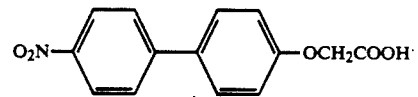

In 100 ml of ethanol was dissolved 5 g (0.0166 mole) of 4-(ethoxycarbonylmethoxy)-4'-nitrobiphenyl, and a solution of 0.7 g (0.0175 mole) of sodium hydroxide dissolved in 20 ml of water was added thereto. The mixture was stirred at 50° C. for 1 hour to obtain 4.4 g of a desired compound as yellow crystal. m.p. 201° to 202° C.

Synthesis of acid chloride of 4-(hydroxycarbonylmethoxy)-4'-nitrobiphenyl

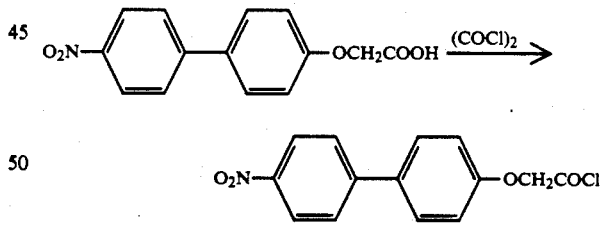

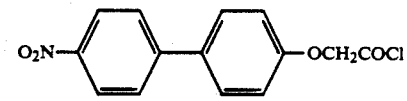

A mixture of 1.5 g (5.0×10$^{-3}$ mole) of 4-(hydroxycarbonylmethoxy)-4'-nitrobiphenyl, 10 ml of oxalic acid chloride and 10 ml of benzene was reacted at 80° C. for 2 hours to obtain acid chloride of a desired compound.

(3) Introduction of Optical Effective Group into Hydrolyzate

In 50 ml of sulfolane was dissolved 1 g of the hydrolyzate of the above vinylidene cyanide-p-methylcarbonyloxybenzoic acid copolymer at 80° C. To the solution was added a solution of 1.59 g of the acid chloride obtained in the above (2) dissolved in 10 ml of sulfolane and further added 0.4 g (5.1×10$^{-3}$ mole) of pyridine. The mixture was stirred at 80° C. for 1.5 hours. Next, the reaction mixture was poured into methanol, and a polymer precipitated was collected by filtration and washed with methanol several times, followed by drying under reduced pressure, to obtain 1.2 g of a polymer represented by the formula shown below.

This polymer had a glass transition temperature of 173° C. A molecular weight of the resulting polymer was measured by using GPC (gel permeation chromatography) and N,N-dimethylformamide as a solvent, and as the results, the polymer had a molecular weight (Mw) of 480,000.

$^1$H—NMR chart of the resulting polymer is shown in FIG. 1. A ratio of each unit of the polymer determined based on the result is shown in the following structural formulae.

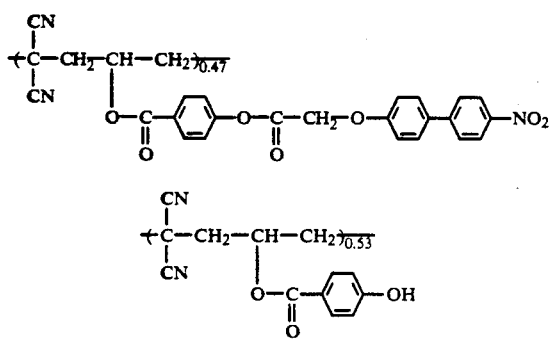

EXAMPLE 2

(1) Synthesis of Optical Effective Group

Synthesis of 4-ethoxymethoxybenzaldehyde

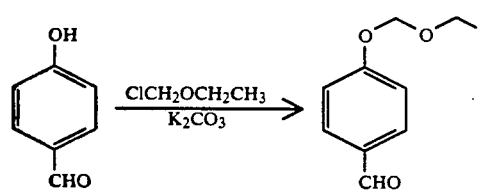

In 500 ml of N,N-dimethylforamide was dissolved 100 g (0.82 mole) of hydroxybenzaldehyde (produced by Wako Junyaku K.K.), and 135 g (0.98 mole) of potassium carbonate was added thereto. The mixture was stirred at 50° C. for 2 hours. To the mixture was added 116 g (1.22 mole) of chloromethyl ethyl ether (produced by Tokyo Kasei K.K.), and the mixture was further stirred for 2 hours to obtain 125 g (yield: 84.7%) of a desired compound as colorless oil. b.p. 97° to 101° C./0.05 mmHg.

Synthesis of 4-(ethoxymethoxy)-4'-nitrostilbene

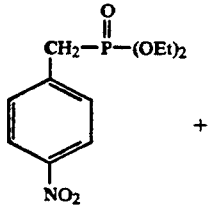

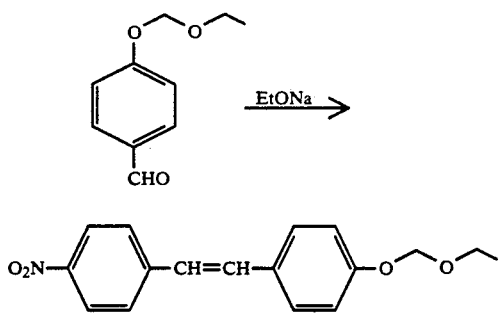

In 1,000 ml of ethanol was dissolved 100 g (0.35 mole) of diethyl p-nitrobenzylphosphonate synthesized according to the method of Yamaguchi et al. (Japan Chemistry Magazine, vol. 91, No. 4, pp. 390 to 392, 1970).

To the solution was carefully added dropwise 8 g of sodium dissolved in 400 ml of ethanol under ice-cooling. Next, after the mixture was allowed to stand until a temperature thereof became room temperature and stirred for a while, a solution of 64 g (0.35 mole) of 4-ethoxymethoxybenzaldehyde synthesized in the above reaction dissolved in 200 ml of ethanol was added dropwise thereto.

The resulting solution was stirred at room temperature for 10 hours to obtain 80 g (yield: 76%) of a desired compound as yellow crystal. m.p. 65° to 67° C.

Synthesis of 4-hydroxy-4'-nitrostilbene

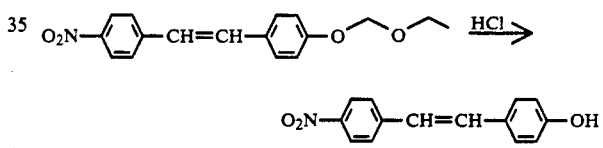

A mixture of 28 g (0.094 mole) of 4-(ethoxymethoxy)-4'-nitrostilbene obtained in the above reaction, 28 ml of hydrochloric acid and 280 ml of tetrahydrofuran was stirred at room temperature for 2 hours to obtain 18.3 g (yield: 81%) of a desired compound as yellow crystal. m.p. 212° to 214° C.

Synthesis of 4-(ethoxycarbonylmethoxy)-4'-nitrostilbene

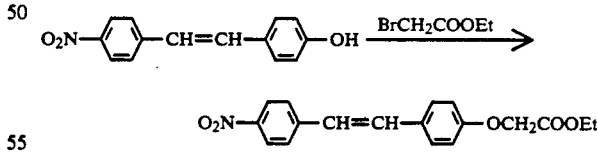

To a solution of 20 g (0.083 mole) of 4-hydroxy-4'-nitrostilbene obtained in the above reaction dissolved in 200 ml of N,N-dimethylformaide was added 20 g (0.145 mole) of potassium carbonate, and the mixture was stirred at 50° C. for 1 hour. Then, a solution of 15 g (0.09 mole) of ethyl bromoacetate (produced by Tokyo Kasei K.K.) dissolved in 50 ml of N,N-dimethylformamide was added thereto, and the mixture was further stirred for 1 hour to obtain 18 g (yield: 66%) of a desired compound. m.p. 113° to 115° C.

Synthesis of 4-(hydroxycarbonylmethoxy)-4'-nitrostilbene

-continued

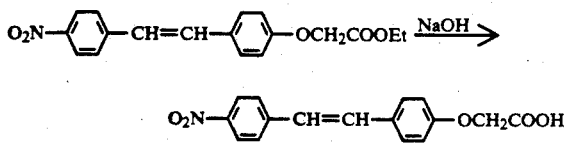

To 5 g (0.0153 mole) of 4-(ethoxycarbonylmethoxy)-4'-nitrostilbene obtained in the above reaction suspended in 400 ml of ethanol was added a solution of 1 g of sodium hydroxide dissolved in 100 ml of water, and the mixture was stirred at 80° C. for 30 minutes to obtain 3.1 g (yield: 68%) of a desired compound as yellow crystal. m.p. 219° to 221° C.

Synthesis of acid chloride of 4-(hydroxycarbonylmethoxy)-4'-nitrostilbene

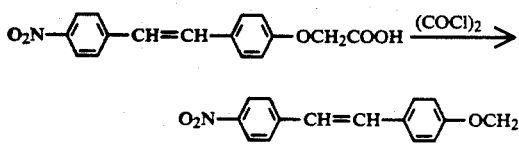

A mixture of 1.5 g ($5 \times 10^{-3}$ mole) of 4-(hydroxycarbonylmethoxy)-4'-nitrostilbene obtained in the above reaction, 4 ml of oxalic acid chloride and 20 ml of sulfolane was stirred at 80° C. for 1.5 hours. Then, benzene was added thereto, and excessive oxalic acid chloride was removed by azeotropy to obtain a sulfolane solution of acid chloride.

(2) Introduction of Optical Effective Group into Hydrolyzate

The procedures were carried out in the same manner as in Example 1 except for using the acid chloride of 4-(hydroxycarbonylmethoxy)-4'-nitrostilbene obtained in the above reaction as an introducing effective group to obtain 1.07 g of a polymer represented by the formula shown below. This polymer had a glass transition temperature of 190° C.

A weight average molecular weight (Mw) of the polymer measured by using GPC was 520,000.

A ratio of each unit of the resulting polymer determined based on the result of $^1$H—NMR chart of the polymer is shown in the following structural formulae.

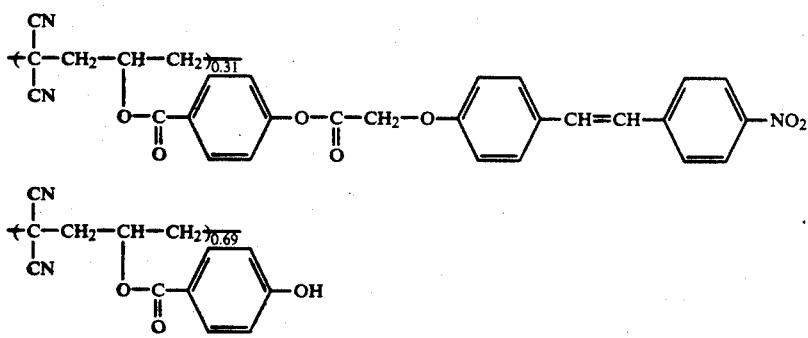

EXAMPLE 3

Each polymer synthesized in Examples 1 and 2 was dissolved in dimethylsulfoxide, respectively, and each solution was coated on a NESA glass by spin coating and dried under reduced pressure to obtain a thin film. Corona polarization was subjected to the spin coat film.

With regard to the spin coat film thus polarization processing, measurement of secondary nonlinear optical constant ($d_{33}$) was carried out according to the method of Jerphagnon et al. (J. Appl. Phys., 41, 1967 (1970)).

The results are shown in Table 1.

TABLE 1

|  | Polarization temperature (°C.) | Secondary nonlinear optical constant $d_{33}$ (pm/v) |
|---|---|---|
| Polymer of Example 1 | 180 | 31 |
| Polymer of Example 2 | 200 | 35 |

EXAMPLE 4

Synthesis of Polymer to be Used for Organic Nonlinear Optical Material (1) Hydrolysis of Vinylidene Cyanide-Vinyl P-Acetoxybenzoate Copolymer In 500 ml of sulfolane was dissolved at 80° C. 10 g of vinylidene cyanide-vinyl p-methylcarbonyloxybenzoate copolymer prepared according to the conventional manner, and a mixture of 25 ml of trifluoroacetic acid and 50 ml of hydrochloric acid was added thereto. The mixture was stirred at 80° C. for 10 hours.

After completion of the reaction, the reaction mixture was poured into water and precipitated hydrolyzate was collected by filtration and washed with water repeatedly until washings became neutral. Next, The hydrolyzate was dried under reduced pressure at 70° to 80° C. to obtain 7.7 g of a hydrolyzate represented by the formula shown below as white powder.

An average molecular weight (Mw) of the vinylidene cyanidevinyl p-acetoxybenzoate copolymer was 500,000. Identification of the resulting hydrolyzate was carried out by $^1$H—NMR (400 MHz, DMSO—$d_6$). As the results, it can be found that hydrolysis ratio at the ester portion of the vinyl benzoate unit was 100%.

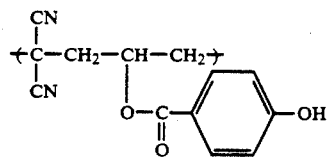

(2) Synthesis of Optical Effective Group

Synthesis of 4-ethoxymethoxybenzaldehyde

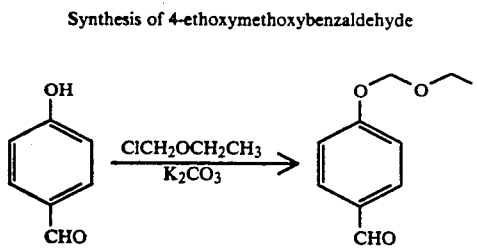

In 500 ml of N,N-dimethylformamide was dissolved 100 g (0.82 mole) of hydroxybenzaldehyde (produced by Wako Junyaku K.K.), and 135 g (0.98 mole) of potassium carbonate was added thereto. The mixture was stirred at 50° C. for 2 hours. To the mixture was added 116 g (1.22 mole) of chloromethyl ethyl ether (produced by Tokyo Kasei K.K.), and the mixture was further stirred for 2 hours to obtain 125 g (yield: 84.7%) of a desired compound as colorless oil. b.p. 97° to 101° C. (0.05 mmHg).

Synthesis of p-methylsulfone toluene

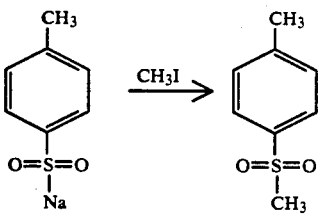

In a mixed solution of 540 ml of methanol and 60 ml of water was dissolved 100 g (0.56 mole) of sodium p-toluenesulfonate (produced by Wako Junyaku K.K.), and 150 g (1.1 mole) of methyl iodide was added thereto. The resulting solution was refluxed by heating for 5 hours to obtain 77 g of a desired compound as colorless crystal. m.p. 84° to 85° C.

Synthesis of 4-methylsulfone bromomethylbenzene

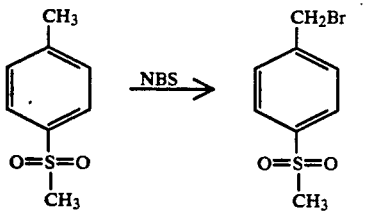

In 50 ml of carbon tetrachloride, 10 g (0.059 mole) of p-methylsulfone toluene obtained in the above reaction was refluxed by heating with 11.5 g (0.065 mole) of N-bromosuccinimide and a small amount of benzoyl peroxide to obtain a desired compound. This compound was used in the next reaction without purification.

Synthesis of diethyl 4-methylsulfone benzylphosphonate

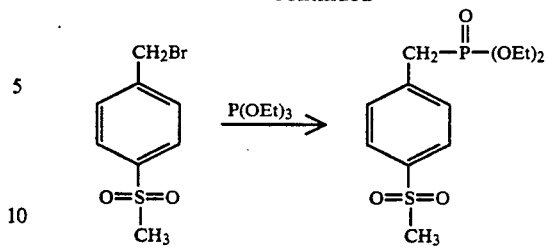

In 6.7 g (0.04 mole) of triethyl phosphite and 100 ml of toluene, 10 g (0.04 mole) of 4-methylsulfone bromomethylbenzene obtained in the above reaction was refluxed by heating to obtain a desired compound.

Synthesis of 4-(ethoxymethoxy)-4'-methylsulfone stilbene

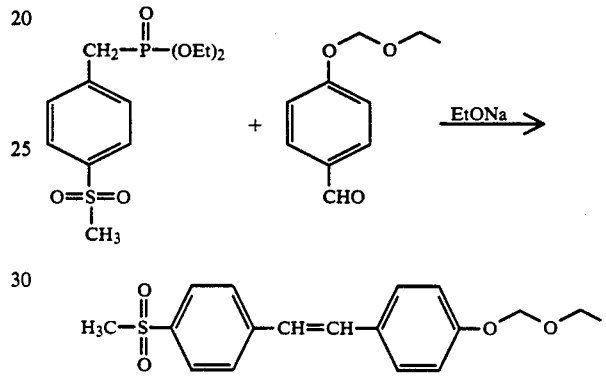

In 400 ml of ethanol was dissolved 39 g (0.127 mole) of diethyl 4-methylsulfone benzylphosphonate obtained in the above reaction. To the solution was carefully added dropwise 2.9 g of sodium dissolved in 200 ml of ethanol under ice-cooling. Next, after the mixture was allowed to stand until a temperature thereof became room temperature and stirred for a while, a solution of 23 g (0.128 mole) of 4-ethoxymethoxybenzaldehyde synthesized in the above reaction dissolved in 100 ml of ethanol was added dropwise thereto. The resulting solution was stirred at room temperature for 10 hours to obtain 22 g (yield: 63%) of a desired compound as white crystal. m.p. 147° to 148° C.

Synthesis of 4-hydroxy-4'-methylsulfone stilbene

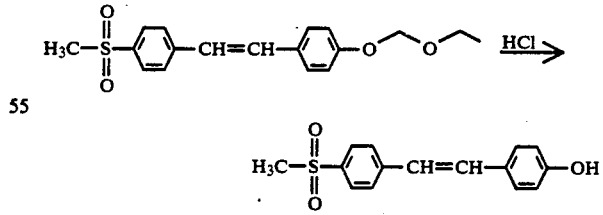

A mixture of 20 g (0.06 mole) of 4-(ethoxymethoxy)-4'-methylsulfone stilbene obtained in the above reaction, 20 ml of hydrochloric acid and 200 ml of tetrahydrofuuran was stirred at room temperature for 2 hours to obtain 10.7 g (yield: 65%) of a desired compound as white crystal. m.p. 224° to 225° C.

Synthesis of 4-(ethoxycarbonylmethoxy)-4'-methylsulfone

-continued stilbene

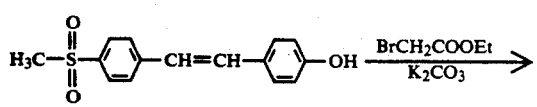

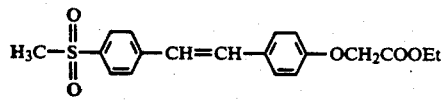

To a solution of 20 g (0.073 mole) of 4-hydroxy-4'-methylsulfone stilbene obtained in the above reaction dissolved in 100 ml of N,N-dimethylformamide was added 18 g (0.13 mole) of potassium carbonate, and the mixture was stirred at 50° C. for 1 hour. Then, 13.5 g (0.081 mole) of ethyl bromoacetate was added thereto, and the mixture was further stirred for 1 hour to obtain 14 g (yield: 53%) of a desired compound. m.p. 188° to 189° C.

Synthesis of 4-(hydroxycarbonylmethoxy)-4'-methylsulfone stilbene

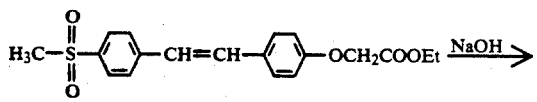

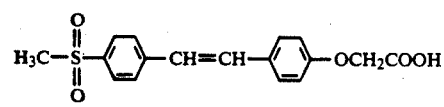

To 14 g (0.0389 mole) of 4-(ethoxycarbonylmethoxy)-4'-methylsulfone stilbene obtained in the above reaction suspended in 500 ml of ethanol was added a solution of 2 g (0.05 mole) of sodium hydroxide dissolved in 200 ml of water, and the mixture was stirred at 80° C. for 2 hours to obtain 10.8 g (yield: 84%) of a desired compound as white crystal. m.p. 229° to 230° C.

Synthesis of acid chloride of 4-(hydroxycarbonylmethoxy)-4'-methylsulfone stilbene

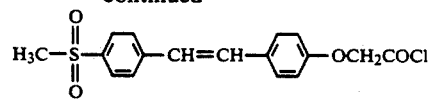

-continued

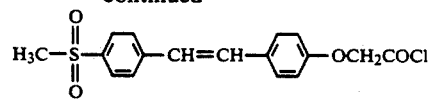

A mixture of 8.9 g (0.0268 mole) of 4-(hydroxycarbonyl-methoxy)-4'-methylsulfone stilbene obtained in the above reaction, 20 ml of oxalic acid chloride and 200 ml of sulfolane was stirred at 80° C. for 5 hours. Then, benzene was added thereto, and excessive oxalic acid chloride was removed by azeotropy to obtain a sulfolane solution of acid chloride.

(3) Introduction of Optical Effective Group into Hydrolyzate

In 100 ml of sulfolane was dissolved 1.5 g of the hydrolyzate of the above vinylidene cyanide-p-methyl-carbonyloxybenzoic acid copolymer at 80° C. To the solution was added the sulfolane solution of the acid chloride obtained in the above (2) and further added 0.5 g ($6.3 \times 10^{-3}$ mole) of pyridine. The mixture was stirred at 60° C. for 5 hours. Next, the reaction mixture was poured into methanol, and a polymer precipitated was collected by filtration and washed with methanol several times, followed by drying under reduced pressure, to obtain 2.5 g of a polymer represented by the formula shown below.

This polymer had a glass transition temperature of 190° C. A molecular weight of the resulting polymer was measured by using GPC (gel permeation chromatography) and N,N-dimethylformamide as a solvent, and as the results, the polymer had a molecular weight (Mw) of 450,000.

Figure 2:
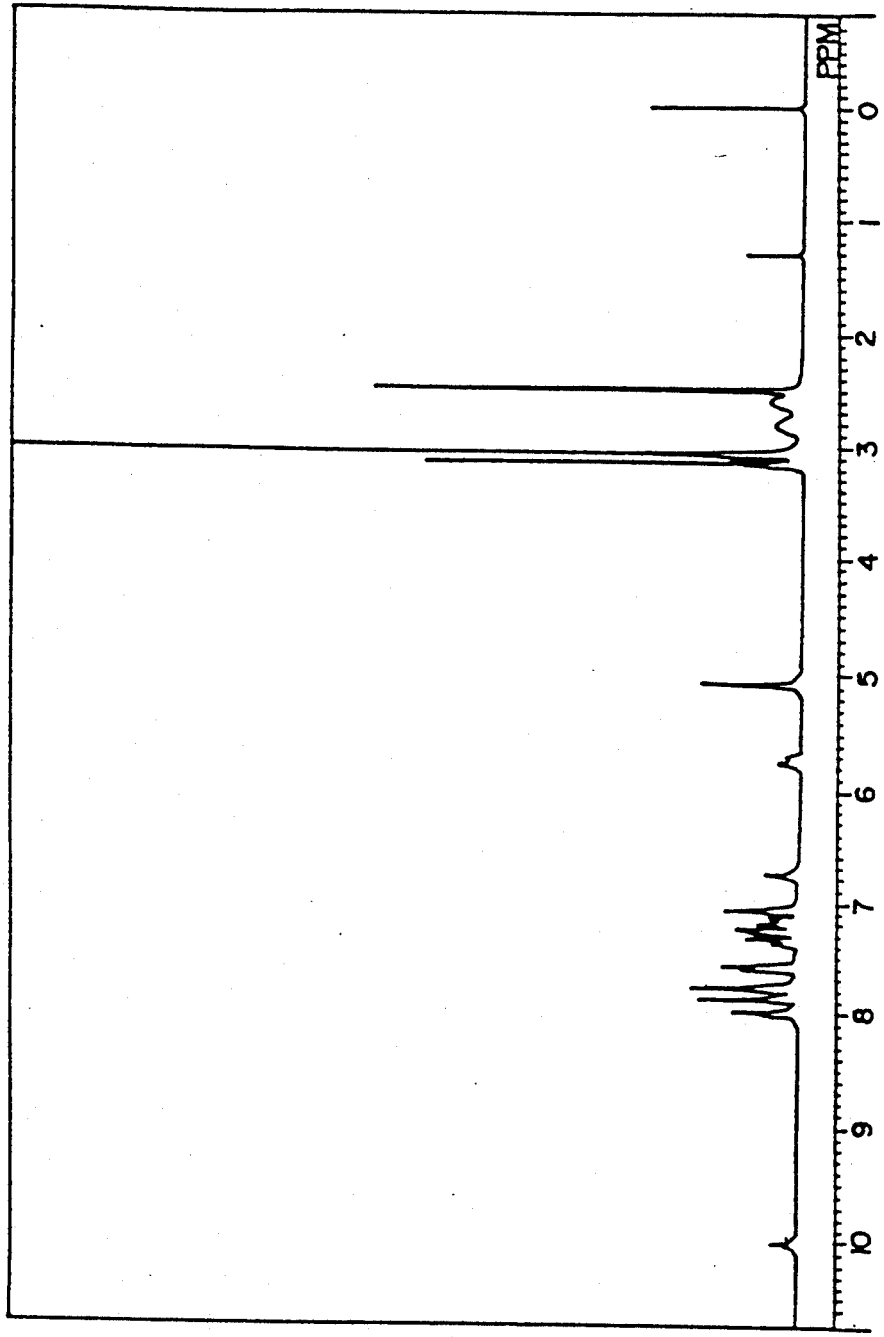
FIG. 2 is a $^1H$—NMR chart of the polymer obtained in Example 4.

$^1$H—NMR chart of the resulting polymer is shown in FIG. 2. A ratio of each unit of the polymer determined based on the result is shown in the following structural formulae.

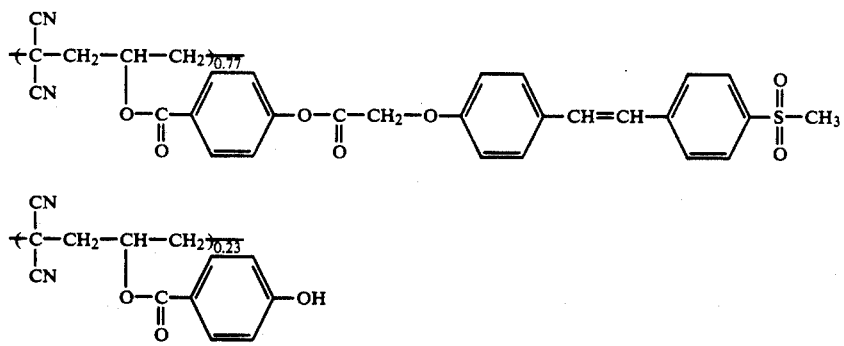

EXAMPLE 5

The polymer synthesized in Example 4 was dissolved in dimethylsulfoxide and the solution was coated on a NESA glass by spin coating and dried under reduced pressure to obtain a thin film. Corona polarization was subjected to the spin coat film.

With regard to the spin coat film thus polarization processing, measurement of secondary nonlinear optical constant ($d_{33}$) was carried out according to the method of Jerphagnon et al. (J. Appl. Phys., 41, 1967 (1970)). The results are shown in Table 2.

TABLE 2

|  | Polarization temperature (°C.) | Secondary nonlinear optical constant $d_{33}$ (pm/v) |
| --- | --- | --- |
| Polymer of Example 4 | 180 | 35 |
| " | 190 | 43 |
| " | 200 | 55 |

The organic nonlinear optical material of the present invention has large nonlinear optical effect and yet is excellent in molding processability so that it is useful for an optical material such as optical wavelength conversion element, optical shutter, optical deflection element, light strength or phase modulation element and high speed light switching element and thus can be widely applied to the fields of optical communication, optical information processing and optical processings. Also, the organic nonlinear optical material of the present invention is excellent not only in the wavelength conversion or electrooptic effect but also piezoelectric or pyroelectric effect so that it can be widely applied to speaker, headphone, ultrasonic wave element, various kinds of sensors such as impact sensor and acceleration sensor, and various kinds of detectors such as infrared sensor, crime prevention sensor, temperature sensor and fire detection.

We claim:

1. An organic nonlinear optical material which comprises a polymer having the following constitutional units, in amounts of 5 to 100 mole % of (I) and 0 to 95 mole % of (II), and a weight average molecular weight (Mw) of the polymer being 10,000 to 2,000,000

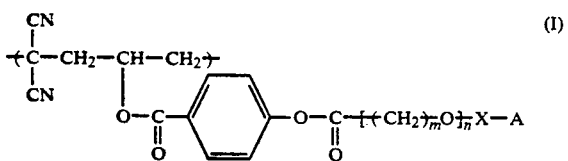

wherein m represents an integer of 1 to 10, n represents 0 or 1, X represents

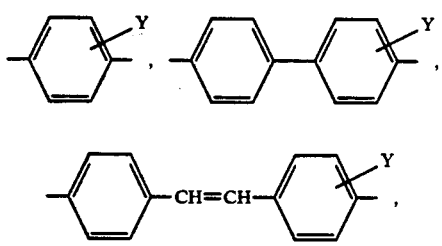

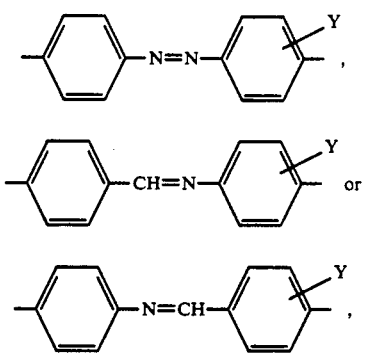

where Y represents hydrogen, fluorine, chlorine, bromine, iodine, $-NO_2$, $-CN$, $-CF_3$ or $-SO_2-C_pH_{2p+1}$, and A represents $-NO_2$, $-CN$, $-CF_3$ or $-SO_2-C_pH_{2p+1}$ where p represents an integer of 1 to 10,

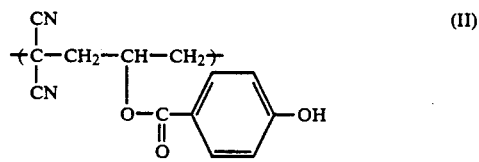

2. The material according to claim 1, wherein both m and n are 1.

3. The material according to claim 1, wherein X is

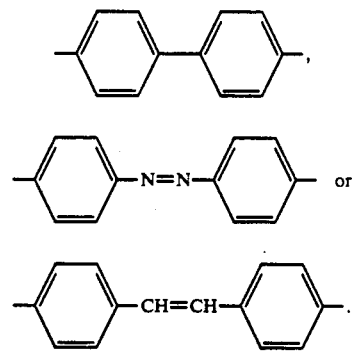

4. The material according to claim 1, wherein A is $-NO_2$, $-CN$, $-CF_3$ or $-SO_2CH_3$.

5. The material according to claim 1, wherein an amount of said unit (I) is 50 to 100 mole % and an amount of said unit (II) is 0 to 50 mole %.

6. The material according to claim 1, wherein the weight average molecular weight (Mw) of said polymer is 500,000 to 1,000,000.

7. The material according to claim 1, wherein the polymer is a film or sheet and stretched to 2- to 6-fold.

8. The material according to claim 7, wherein the polymer is a film or sheet polarized by applying a current voltage of 10 kv/cm or more.

* * * * *